United States Patent [19]

Mizuno et al.

[11] Patent Number: 4,965,143
[45] Date of Patent: Oct. 23, 1990

[54] SHUTDOWN METHOD FOR FUEL CELL SYSTEM

[75] Inventors: Yutaka Mizuno; Toshiharu Hanajima; Hisayoshi Matsubara, all of Iwata, Japan

[73] Assignee: Yamaha Hatsudoki Kabushiki Kaisha, Iwata, Japan

[21] Appl. No.: 435,041

[22] Filed: Nov. 9, 1989

[51] Int. Cl.$^5$ ............................................. H01M 8/04
[52] U.S. Cl. .......................................... 429/17; 429/19
[58] Field of Search ...................................... 429/17, 19

[56] References Cited

U.S. PATENT DOCUMENTS 4,657,826  4/1987  Tajima ................................. 429/17

Primary Examiner—Donald L. Walton
Attorney, Agent, or Firm—Ernest A. Beutler

[57] ABSTRACT

An improved system for shutting down a fuel cell that cools the reformer catalyst bed by continuing to supply unreformed fuel to the catalyst bed after the supply of heat to the evaporator is discontinued for cooling the catalyst bed more rapidly through an endothermic reaction.

30 Claims, 2 Drawing Sheets

SHUTDOWN METHOD FOR FUEL CELL SYSTEM

BACKGROUND OF THE INVENTION

This invention relates to a shut down method for a fuel cell system and a fuel cell system itself.

As is well known, a fuel cell operates to react an enriched fuel such as hydrogen with air so as to generate electrical energy through the stack of a fuel cell. The hydrogen fuel is obtained by reforming a methanol/water mixture in a reformer that is comprised of a catalyst and a heater for vaporizing the unreformed fuel. Fuel cells are generally employed as stationary power units wherein they are operated for long periods of time. There are, however, applications wherein it would be desirable to employ a fuel cell as a source of electrical power during intermittent operation, such as in the operation of a small electrically powered vehicle. As such, the fuel cell must be not only compact but must be capable of being turned on and off more frequently than stationary power supplies. Therefore, the shutdown for the fuel cell is particularly important and the shutdown of the reformer can be a significant part of this operation.

Specifically, when the reformer is shut off, the temperature of the reformer and specifically the catalyst bed reduces only gradually. Because of this slow cool down of the reformer and specifically its catalyst bed, methanol and water vapor in the reformer can be condensed so as to create a negative pressure within the reformer. Although valves are normally employed for closing off the reformer from the atmosphere when the system is shut down, air can easily leak back into the reformer under such negative pressure conditions and cause oxidation and deterioration of the catalyst material.

In order to prevent such deterioration of the catalyst bed, systems have been proposed wherein the reformer is purged with an inactive gas such as nitrogen until the catalyst temperature becomes sufficiently low that condensation and deterioration are not a problem. However, such systems require a source of the inactive or inert gas and the necessary valving and pressure regulations for them. Therefore, this type of system becomes quite complicated and bulky.

Another method of protecting the catalyst bed has been to fill it with fuel once the system is shut down. However, the surrounding of the catalyst with fuel when the system is shut down can give cause to problems, particularly on subsequent start ups. The subsequent start up of the catalyst that has been filled with fuel can cause significant expansion on restart which can interfere with the catalyst bed either by deteriorating it or by altering its state of packing, thus making it less efficient.

It is, therefore, a principal object of this invention to provide an improved fuel cell system and reformer arrangement for such a system.

It is a further object of this invention to provide an improved method for shutting down the reformer of a fuel cell system.

It is a further object of this invention to provide an arrangement for more rapidly lowering the temperature of the catalyst bed of a reformer for a fuel cell during shutdown so as to avoid deterioration or damage to the catalyst material and bed.

SUMMARY OF THE INVENTION

This invention is adapted to be embodied in a method of shutting down a reformer for reforming a fuel for supply to the fuel port of a fuel cell to generate electrical energy. The reformer is comprised of a catalyst bed and a heater for vaporizing the unreformed fuel prior to delivery to the catalyst bed. In accordance with the method, the amount of heat supplied to the heater is reduced during shutdown while continuing to supply unreformed fuel to the catalyst bed for cooling the catalyst bed through an endothermic reaction until the temperature of the catalyst bed falls below its working temperature by a predetermined amount. When this occurs, the supply of unreformed fuel to the catalyst bed is discontinued.

The invention is also adapted to be embodied in a reformer for supplying reformed fuel to the fuel port of a fuel cell to generate electrical energy. The reformer is comprised of a catalyst bed and a heater for vaporizing the unreformed fuel prior to delivery to the catalyst bed. Shutdown means are provided that include means for reducing the amount of heat supplied by the heater while continuing to supply unreformed fuel to the catalyst bed for cooling the catalyst bed through an endothermic reaction. Means are then provided for discontinuing the supply of unreformed fuel to the catalyst bed at a predetermined time after the amount of heat supplied to the heater has been reduced.

DETAILED DESCRIPTION OF THE PREFERRED EMBODIMENTS OF THE INVENTION

Figure 1:
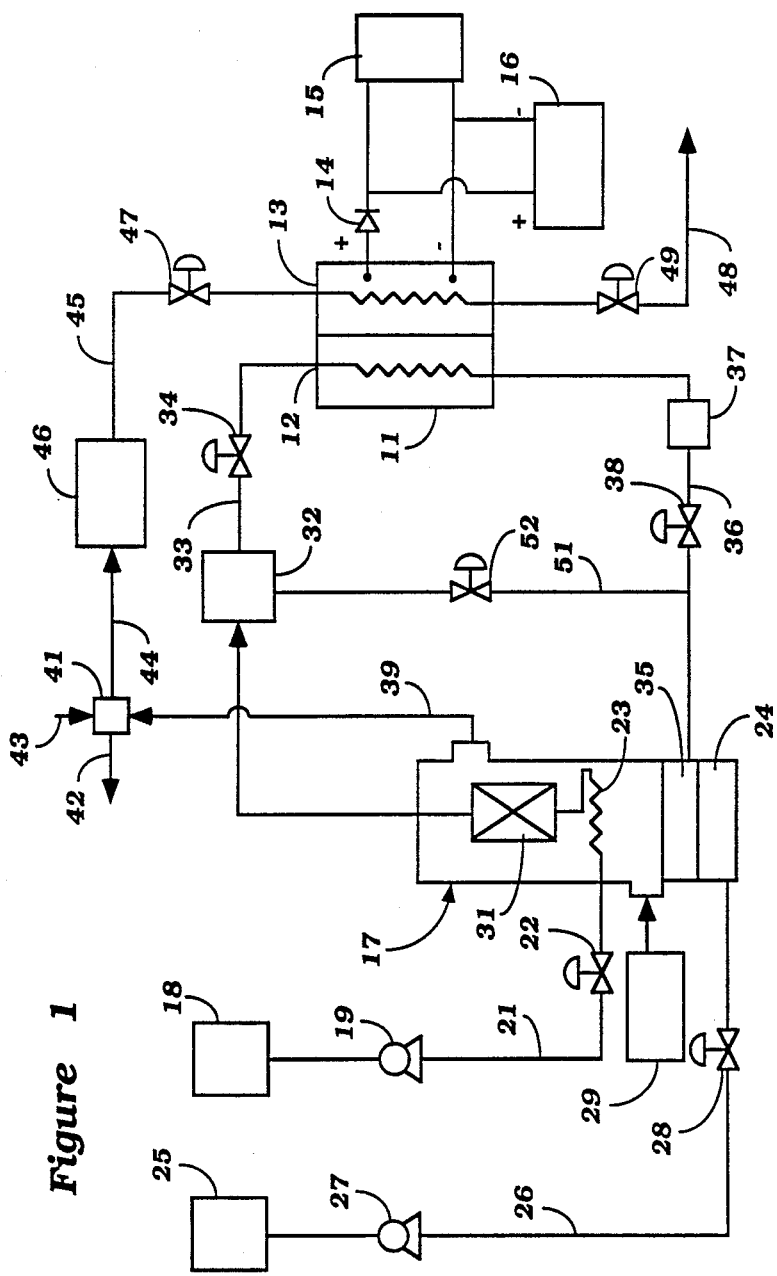
FIG. 1 is a partially schematic view of a fuel cell constructed in accordance with an embodiment of the invention.

Referring first to FIG. 1, a fuel cell system is depicted which includes a fuel cell 11 that has a fuel port 12, an air port 13 and an interposed stack of electrolytic matrix core so as to generate electrical energy upon the reaction of the fuel and air in the fuel cell 11. As a typical utilization for the fuel cell 11, the anode port is connected through a diode 14 to an electric motor 15 for operating the motor 15. The anode and cathode of the fuel cell 11 are also connected to a storage battery 16 for charging the storage battery during such periods that the motor 15 is not operated at full capacity.

A reformer, indicated generally by the reference numeral 17 is provided for supplying fuel to the fuel port 12 of the fuel cell 11. The reformer 17 receives fuel in the form of an appropriate mixture of water and methanol from a fuel tank 18 through a fuel supply pump 19, conduit 21 and fuel control valve 22. The fuel from the valve 22 is supplied to a vaporizer unit 23 of the reformer 17.

The vaporizer 23 is heated by a heater 24 that is supplied with fuel from a heater fuel tank 25 through a line 26 in which a feed pump 27 and control valve 28 are positioned. The fuel for the heater 24 may be of any suitable type, such as methanol.

A blower 29 supplies atmospheric air to the reformer 17 for the combustion and for heating the vaporizer 23. The vaporized fuel is delivered to a catalyst bed 31 for completing the reforming and the reformed fuel is then supplied to a storage tank 32. The storage tank 32 communicates with the fuel inlet port 12 of the fuel cell 11 through a conduit 33 in which a control valve 34 is positioned. Any hydrogen fuel which is not consumed within the fuel cell 11 is returned to a separate burner or heater 35 of the reformer 17 through a conduit 36. A phosphoric acid recoverer 37 is positioned in the conduit 36 and downstream of the phosphoric acid recoverer 37 there is provided a control valve 38.

Figure 2:
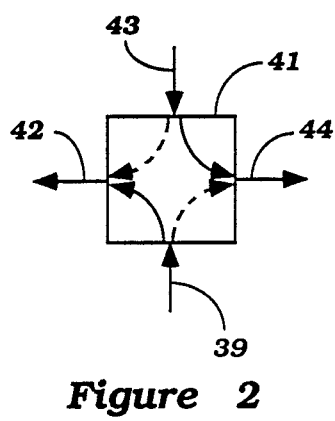
FIG. 2 is a schematic view showing the construction and operation of the exhaust control valve for start up operation.

An exhaust pipe 39 conveys the combustion products from the reformer 17 to a port of a control valve 41. The control valve 41 has an atmospheric exhaust port 42 and an atmospheric inlet port 43. A supply port 44 selectively supplies either atmospheric air from the port 43 or heated exhaust gases from the exhaust pipe 39 to the air port 13 of the fuel cell 11 through a conduit 45 in which a blower 46 and control valve 47 is provided. Referring specifically to FIG. 2, the control valve 41 is shown in its normal running condition. In this condition, atmospheric air is supplied to the air port 13 from the atmospheric inlet 43 and conduit 44. Exhaust gases from the reformer 17 are, however, returned to the atmosphere through the exhaust port 42. These flows are shown in the solid line views of FIG. 2.

During start up, as will be described, the valve 41 is shifted to the position where the flow pattern shown by the broken lines is accomplished as is described in the copending application entitled "Fuel Cell System", Ser. No. 427,756, filed 10/26/89 and assigned to the Assignee of this application. In this condition, exhaust gases from the exhaust pipe 39, which still contain a sufficient quantity of air for operation of the fuel cell 11 are delivered to the air port 13 and the atmospheric air port 43 communicates with the exhaust port 42. The supply of heated exhaust gases to the air port 13 will help in assisting the bringing of the fuel cell 11 up to its operating temperature.

The fuel cell 11 has an exhaust port 48 in which a control valve 49 is provided for a purpose to be described. In addition, there is provided a bypass conduit 51 that extends from the fuel reservoir 32 back to the burner 35. A control valve 52 is positioned in the bypass line 51 and is normally closed during running of the system once the fuel cell 11 and reformer 17 are at their operating temperatures.

OPERATION

Assuming that the system has been shutdown and it is desired to start the system up, the burner 24 is supplied with fuel from the source 25 through the operation of the fuel supply pump 27 and the opening of the fuel control valve 28. In addition, air supply is initiated by turning on the blower 29 and the reformer 17 and specifically the catalyst bed 31 will be heated. At this time, no fuel to be reformed is supplied from the fuel reservoir 18 since the pump 19 will be turned off and the valve 22 will be closed. However, as soon as the catalyst bed 31 reaches its operating temperature, which is in the range of 180° C. to 320° C., assuming the catalyst is a material such as a material from the copper family, the copper/zinc family, the copper/chromium family or the like, the supply of fuel to be reformed from the reservoir 18 is initiated by the starting of the pump 19 and the opening of the valve 22.

At this time, the control valve 41 is switched so that as the exhaust air from the exhaust pipe 39 is delivered to the air port 13 for heating of the fuel cell 11. The valve 52 is closed at this time and the valve 34 is open so that fuel will be supplied to the fuel port 12 so that the fuel cell 11 can begin to operate. This is done when the fuel cell raises to a predetermined temperature such as in the range of 120° C. to 200° C. and will then be able to generate electricity. Once the fuel cell 11 reaches its full operating temperature, the control valve 41 is switched so that atmospheric air from the port 43 is supplied to the line 44 and the exhaust pipe 39 communicates directly with the atmosphere 42. Once the reaction begins, the valve 38 can be opened and the additional burner 35 ignited so as to assist in the vaporization in the evaporator 23.

Figure 3:
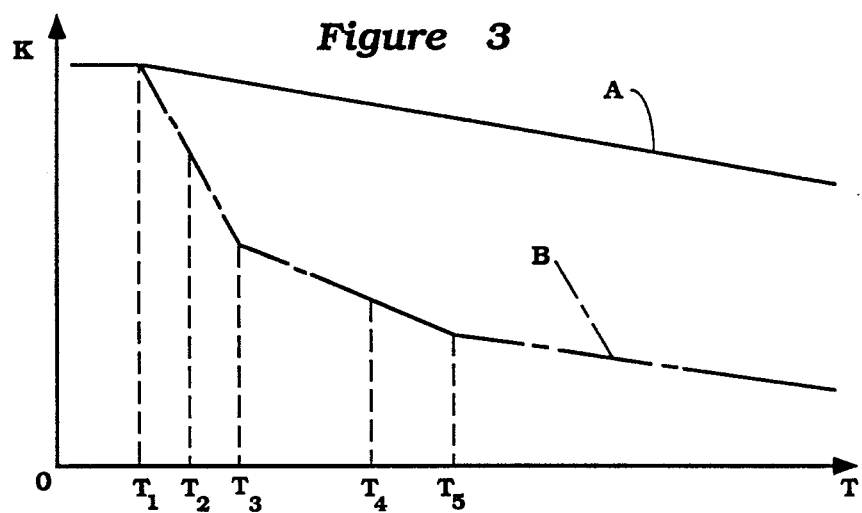
FIG. 3 is a temperature versus time curve showing the cooling of the catalyst bed of a reformer constructed in accordance with the prior art and a reformer being shutdown in accordance with the method of the invention.

The shutdown operation will be described by additional reference to FIG. 3 wherein the temperature of the reformer 17 and specifically of the catalyst in the catalyst bed 31 is shown by two curves. The curve A indicates the temperature of the catalyst bed in a conventional system not having the shutdown features of this invention. It should be noted that the temperature will maintain at the normal operating temperature up until the point $T_1$ when the shutdown begins. When shutdown begins in a normal system, the temperature of the catalyst bed 31 falls gradually as shown by the solid line A. In accordance with the invention, however, the temperature is dropped more rapidly as shown by the dot-dash curve B, which rapid cooling is achieved by the method now to be described.

At the point $T_1$, the amount of fuel supplied to the burner 24 from the reservoir 25 is steadily reduced by gradually slowing the speed of the pump 27. Thus, the amount of heat applied to the reformer 17 is gradually reduced. This may be done in either steps or on a continuous basis following some predetermined curve as may be desired. The supply of fuel to be reformed from the fuel supply tank 18 is also gradually reduced but is not stopped completely. This reduction can also be accomplished by varying the speed of the pump 19 either in steps or along a curve. At this time, the control valve 41 is left in the normal operating position so that cooling air from the atmospheric port 43 is supplied to the fuel cell 11 by the blower 46 so as to assist in cooling down of the fuel cell 11.

During this stage of operation, the catalyst bed 31 will be cooled by the endothermic chemical reaction of the vaporized fuel from the source in accordance with the following reaction:

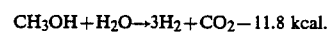

$$CH_3OH + H_2O \rightarrow 3H_2 + CO_2 - 11.8 \text{ kcal.}$$

This reaction will cause the temperature of the catalyst bed 31 to drop rapidly as shown by the curve B up until a second point in time $T_2$. The point of time $T_2$ is a time that is determined by the output level of the fuel cell system, the temperature of the reformer and specifically the catalyst bed 31 and so on. At this point in time, the bypass valve 52 is open and the hydrogen inlet valve 34 to the fuel cell 11 is closed as is the hydrogen outlet valve 38 which would supply fuel to the additional burner 35. Therefore, the temperature continues to fall up to a point in time $T_3$.

The point in time $T_3$ is determined by the time required for the catalyst bed 31 to be cooled down to a temperature wherein there will be substantially no catalyzation of the chemical reaction of the fuel source. This temperature is normally in the range of 110° C. to 180° C. This is a temperature that is low enough that any air that comes into the reformer 17 will not be reacted so as to cause an exothermic oxidizing reaction which would heat the catalyst. This is a temperature that is lower than the usual working temperature which is near the upper limit of the efficient working temperature by 20° C. to 50° C. and at the lowest is lower than the lowest working temperature by about 20° C.

Upon further cooling to the point $T_4$ the reformer 17 will no longer form any hydrogen and the bypass valve 52 is closed so that no fuel will be supplied to the supplemental burner 35 and further cooling will continue. During this time, the blower motor 29 is continued to run so as to further assist in the cooling of the catalyst bed 31. At a further point in time $T_5$ when the catalyst bed 31 is no longer at a temperature when any reaction will occur, then the blower motors 29 and 46 are shut off and the system can cool down sufficiently through natural cooling along a curve that parallels the curve A but which is substantially lower due to the use of the endothermic reaction for cooling of the catalyst bed 31.

It should be readily apparent from this description that the continued supply of fuel to the catalyst bed 31 from the source 18 permits cooling of the catalyst bed by the endothermic reaction and thus shutdown time is significantly improved and damage to the catalyst bed is substantially reduced.

Figure 4:
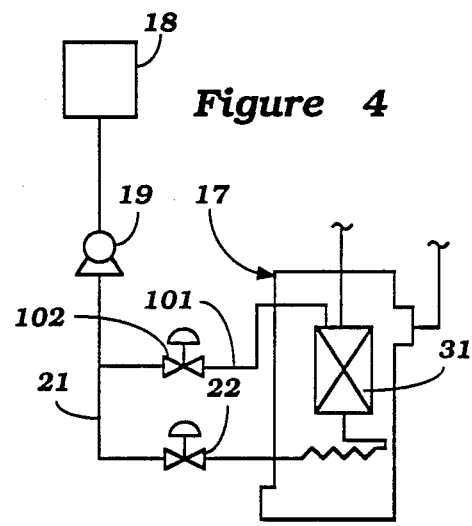
FIG. 4 is a partial schematic view showing another arrangement for improving the shutdown operation.

In the embodiment thus far described, the fuel to be reformed is supplied to one side of the catalyst bed 31 (the inlet side) so as to assist in cool down. Even more rapid cool down may be accomplished through the system shown in FIG. 4 which is generally the same as the previously described embodiment and, for that reason, only a portion of the construction is illustrated. In this embodiment, there is provided a separate line 101 from the pump 19 to the catalyst bed 31 on its outlet side in which a control valve 102 is positioned. The control valve 102 is open on the shutdown operation so as to insure that more of the area of the catalyst bed 31 will be exposed to fuel to be reformed so as to further assist in the cool down.

The foregoing description is that of preferred embodiments of the invention. It should be readily apparent to those skilled in the art that various changes and modifications may be made without departing from the spirit and scope of the invention, as defined by the appended claims.

We claim:

1. The method of shutting down a reformer for reforming a fuel for supply to the fuel port of a fuel cell to generate electrical energy, the reformer being comprised of a catalyst bed and a heater for vaporizing the fuel for supply to the catalyst bed, said shutdown method comprising the steps of reducing the amount of heat supplied to the heater while continuing to supply unreformed fuel to the catalyst bed for cooling the catalyst bed through an endothermic reaction until the temperature of the catalyst bed falls below its working temperature by a predetermined amount and thereafter discontinuing the supply of unreformed fuel to the catalyst bed.

2. The method of shutting down a reformer as set forth in claim 1 further including blower means for circulating air across the catalyst bed.

3. The method of shutting down a reformer as set forth in claim 1 further including step of continuing the operation of the blower means until after the supply of unreformed fuel to the catalyst bed is discontinued.

4. The method of shutting down a reformer as set forth in claim 3 wherein the blower means supplies air to the heater for burning of fuel therein.

5. The method of shutting down a reformer as set forth in claim 3 wherein the blower means extracts air from the reformer.

6. The method of shutting down a reformer as set forth in claim 5 further including control valve means for selectively communicating the exhaust from the reformer to the air port of the fuel cell for heating the fuel cell during start up.

7. The method of shutting down a reformer as set forth in claim 1 wherein the amount of heat supplied to the heater is gradually reduced.

8. The method of shutting down a reformer as set forth in claim 7 wherein the amount of heat supplied to the heater is reduced in steps.

9. The method of shutting down a reformer as set forth in claim 7 wherein the amount of heat supplied to the heater is reduced continuously along a curve.

10. The method of shutting down a reformer as set forth in claim 7 further including blower means for circulating air across the catalyst bed.

11. The method of shutting down a reformer as set forth in claim 10 further including step of continuing the operation of the blower means until after the supply of unreformed fuel to the catalyst bed is discontinued.

12. The method of shutting down a reformer as set forth in claim 11 wherein the blower means supplies air to the heater for burning of fuel therein.

13. The method of shutting down a reformer as set forth in claim 11 wherein the blower means extracts air from the reformer.

14. The method of shutting down a reformer as set forth in claim 13 further including control valve means for selectively communicating the exhaust from the reformer to the air port of the fuel cell for heating the fuel cell during start up.

15. The method of shutting down a reformer as set forth in claim 1 wherein fuel to be reformed is supplied to the outlet side of the catalyst bed during shutdown operation for assisting in cooling of the catalyst bed.

16. A reformer for reforming a fuel for supply to the fuel port of a fuel cell to generate electrical energy, said reformer being comprised of a catalyst bed and a heater for vaporizing the fuel for supply to the catalyst bed, shutdown means comprising means for reducing the amount of heat supplied to said heater while continuing to supply unreformed fuel to the catalyst bed for cooling the catalyst bed through an endothermic reaction until the temperature of the catalyst bed falls below its working temperature by a predetermined amount and means for discontinuing the supply of unreformed fuel to said catalyst bed after a predetermined temperature has been reached.

17. A reformer as set forth in claim 16 further including blower means for circulating air across the catalyst bed.

18. A reformer as set forth in claim 16 wherein the shutdown means further includes means for operating the blower means until after the supply of unreformed fuel to the catalyst bed is discontinued.

19. A reformer as set forth in claim 18 wherein the blower means supplies air to the heater for burning of fuel therein.

20. A reformer as set forth in claim 18 wherein the blower means extracts air from the reformer 21. A reformer as set forth in claim 20 further including control valve means for selectively communicating the exhaust from the reformer to the air port of the fuel cell for heating the fuel cell during start up.

22. A reformer as set forth in claim 16 wherein the amount of heat supplied to the heater is gradually reduced.

23. A reformer as set forth in claim 22 wherein the amount of heat supplied to the heater is reduced in steps.

24. A reformer as set forth in claim 22 wherein the amount of heat supplied to the heater is reduced continuously along a curve.

25. A reformer as set forth in claim 22 further including blower means for circulating air across the catalyst bed.

26. A reformer as set forth in claim 25 wherein the shutdown means further including means for continuing the operation of the blower means until after the supply of unreformed fuel to the catalyst bed is discontinued.

27. A reformer as set forth in claim 26 wherein the blower means supplies air to the heater for burning of fuel therein.

28. A reformer as set forth in claim 26 wherein the blower means extracts air from the reformer.

29. A reformer as set forth in claim 28 further including control valve means for selectively communicating the exhaust from the reformer to the air port of the fuel cell for heating the fuel cell during start up.

30. A reformer as set forth in claim 16 wherein the shutdown means further includes means for supply to the outlet side of the catalyst bed during shutdown operation for assisting in cooling of the catalyst bed.

* * * * *